United States Patent [19]

Uno et al.

[11] Patent Number: 5,774,309
[45] Date of Patent: Jun. 30, 1998

[54] MAGNETIC TRANSDUCER AND THIN FILM MAGNETIC HEAD

[75] Inventors: Yasufumi Uno, Minamisaku-gun; Kiyosumi Kanazawa, Miyotamachi; Masato Takahashi, Usudamachi, all of Japan

[73] Assignee: TDK Corporation, Tokyo, Japan

[21] Appl. No.: 824,135

[22] Filed: Mar. 25, 1997

Related U.S. Application Data

[63] Continuation of Ser. No. 530,722, Sep. 15, 1995, abandoned.

[30] Foreign Application Priority Data

Sep. 16, 1994 [JP] Japan .................................. 6-222121

[51] Int. Cl.$^6$ ...................................................... G11B 5/39
[52] U.S. Cl. .......................................................... 360/113
[58] Field of Search ............................ 360/113; 324/252; 338/32 R

[56] References Cited

U.S. PATENT DOCUMENTS

| | | | |
|---|---|---|---|
| 4,024,489 | 5/1977 | Bajorek et al. ...................... | 338/32 R |
| 5,018,037 | 5/1991 | Krounbi et al. ...................... | 360/113 |
| 5,442,507 | 8/1995 | Koga et al. .......................... | 360/113 |
| 5,528,440 | 6/1996 | Fontana et al. ..................... | 360/113 |
| 5,600,518 | 2/1997 | Koga .................................... | 360/113 |

FOREIGN PATENT DOCUMENTS

| | | |
|---|---|---|
| 3-30107 | 2/1991 | Japan . |
| 3-269814 | 12/1991 | Japan . |
| 3-283477 | 12/1991 | Japan . |
| 6-131632 | 5/1994 | Japan . |

*Primary Examiner*—Stuart S. Levy
*Assistant Examiner*—William J. Klimowicz
*Attorney, Agent, or Firm*—Oblon, Spivak, McClelland, Maier & Neustadt, P.C.

[57] ABSTRACT

A central active area includes a MR film, a nonmagnetic spacer film and a soft magnetic film with the MR film constituting the lowermost layer on top of a supporting body, the nonmagnetic spacer film laminated on top of the MR film and the soft magnetic film laminated on top of the nonmagnetic spacer film to provide a lateral bias field to the MR film. A magnetic transducer and a thin film magnetic head with which the main peak width in the off track characteristics can be increased and, consequently, the margin can be increased are provided.

5 Claims, 3 Drawing Sheets

MAGNETIC TRANSDUCER AND THIN FILM MAGNETIC HEAD

This application is a Continuation of application Ser. No. 08/530,722, filed on Sep. 15, 1995, now abandoned.

BACKGROUND OF THE INVENTION

1. Field of the Invention

The present invention relates to a magnetic transducer that employs the magnetoresistive effect and a thin film magnetic head that includes this magnetic transducer.

2. Discussion of Background

In the current trend for more compact magnetic disk drive devices, a thin film magnetic head that employs a magnetoresistive element for a read element is known in the prior art as a magnetic conversion device suited for reading information stored in a magnetic recording medium at a high recording density, since its output is not affected by its speed relative to the magnetic disk.

Magnetic transducers used in thin film magnetic heads in the prior art include the one disclosed in Japanese Unexamined Patent Publication (Kokai). No. 125311/1991. The magnetoresistive read device disclosed in this publication is provided with a central active area and a pair of passive areas. The central active area includes a magnetoresistive film, a nonmagnetic spacer film and a soft magnetic film, and the soft magnetic film provides a lateral bias field to the magnetoresistive film. These films are formed so that the soft magnetic film constitutes the lowermost layer, the nonmagnetic spacer film constitutes the middle layer and the magnetoresistive film constitutes the uppermost layer. The pair of end passive areas each include a magnetic domain control film and a lead conductive film. The magnetic control films are laminated at the two opposing sides of the central active area forming a gap between them, and the lead conductive films are adhered on top of the magnetic domain control films.

The soft magnetic film included in the central active area provides a lateral bias field to the magnetoresistive film and, with this, it ensures linear operation when reading out data that have been magnetically recorded. When the magnetic field generated from the magnetically recorded data on the magnetic recording medium is applied to the magnetoresistive film in the direction that intersects the magnetization direction of the magnetoresistive film, the direction of magnetization in the magnetoresistive film changes. This, in turn, causes the resistance value in the magnetoresistive film to change in correspondence to the direction of magnetization and a sense voltage corresponding to the resistance value is generated. When the magnetic field generated by the magnetically recorded data on the magnetic recording medium aligns with the magnetization direction of the magnetoresistive film, however, the direction of magnetization does not change and, therefore, the resistance value of the magnetoresistive film remains practically unchanged.

The magnetic domain control films are provided in order to provide a longitudinal bias field to the magnetoresistive film and, consequently, to prevent Barkhausen noise. U. S. Pat. No. 4, 024, 489 discloses an MR sensor that employs a hard magnetic bias film used as a magnetic domain control film.

As described earlier, with this type of magnetic transducer, when the magnetic field generated by the magnetically recorded data on the magnetic recording medium aligns with the magnetization direction of the magnetoresistive film, the direction of the magnetization does not change, and therefore, the resistance value of the magnetoresistive film remains practically unchanged. Now, taking the off track characteristics into consideration, since the magnetic field generated by the magnetically recorded data on the magnetic recording medium disperses in every direction, when the magnetic transducer reads magnetically recorded information on one track while making relative movement at high speed in the direction of the track, there exists a point at which the direction of the magnetic field generated by the magnetically recorded data on the magnetic recording medium aligns with the magnetization direction of the magnetoresistive film, and the output at that point is at its minimum. This minimum point is determined by the magnetization direction of the magnetoresistive film and the more intense the magnetic field of the lateral bias (the greater the bias angle), the closer it moves toward the main output peak point. In contrast, as the magnetic field of the lateral bias becomes reduced (the smaller the bias angle), it moves away from the main output peak point. The further away the minimum point moves from the main output peak point, the wider the main output pulse width becomes, thus securing a large off track margin and facilitating the design of the signal processing circuit.

The magnitude of the lateral bias field is determined by the ratio of the product of the saturation magnetization M0 and the volume V0 of the soft magnetic film, to the product of the saturation magnetization M1 and the volume V1 of the magnetoresistive film, i. e., (M0. V0) / (M1. V1). The larger the ratio (M0. V0) / (M1. V1), the stronger the lateral bias field.

In this type of magnetic transducer, its central active area is normally formed through high accuracy pattern forming technology which employs photolithography, ion milling or the like. When the laminated films are patterned through such a process, conventionally the lower the film is, the larger its surface area. With a magnetic transducer in the prior art, since films are laminated in such a manner that the soft magnetic film constitutes the lowermost layer, the nonmagnetic spacer film constitutes the middle layer and the magnetoresistive film constitutes the uppermost layer, as explained earlier, the flat surface area S0 of the lower layer, i. e., the soft magnetic film, is larger than the flat surface area S1 of the uppermost layer, i. e., the magnetoresistive film. In other words, S0>S1. Note that the film thickness of the soft magnetic film is approximately equal to that of the magnetoresistive film.

Because of this, under normal conditions, in which the saturation magnetization M0 of the soft magnetic film is approximately 1 to 0. 6 times the saturation magnetization M1 of the magnetoresistive film, the ratio (M0. V0)/(M1. V1) is large. This presents an over bias condition, and when the off track characteristics are taken into account, it means that it is difficult to set the minimum point where the direction of the magnetic field generated by the magnetically recorded data on the magnetic recording medium aligns with the direction of the magnetization on the magnetoresistive film at a location that is away from the main output peak point. Thus, with a magnetic transducer in the prior art, it is difficult to increase the off track margin by expanding the width of the main output pulse.

Note that, while, with a small quantity of over bias, the bias can be adjusted to the correct state by reducing the sense current, this will result in reduced output.

SUMMARY OF THE INVENTION

It is an object of the present invention to provide a magnetic transducer and a thin film magnetic head that facilitate the design of the signal processing circuit by expanding the width of the main output pulse and, consequently, by increasing the margin.

It is a further object of the present invention to provide a magnetic transducer and a thin film magnetic head that make it possible to set the bias to an appropriate state without lowering the output by adjusting the sense current.

In order to achieve the objects described above, the magnetic transducer according to the present invention comprises a central active area and end passive areas and is supported by a supporting body. The central active area includes a magnetoresistive film, a nonmagnetic spacer film and a soft magnetic film with the magnetoresistive film constituting the lowermost layer on top of the supporting body, the nonmagnetic spacer film laminated on top of the magnetoresistive film and the soft magnetic film laminated on top of the nonmagnetic spacer film to provide a lateral bias field to the magnetoresistive film. The end passive areas are connected to the two side surfaces of the central active area.

The thin film magnetic head according to the present invention comprises a slider and a magnetic transducer supported by the slider, in which the magnetic transducer is constituted as described above.

Since the central active area includes a magnetoresistive film, a nonmagnetic spacer film and a soft magnetic film, and is structured with these films laminated in such a manner that the soft magnetic film provides a lateral bias field to the magnetoresistive film, the magnetization direction of the magnetoresistive film is changed by the magnetic field generated by the magnetically recorded data on the magnetic recording medium, which will in turn, change the resistance value of the magnetoresistive film. Consequently, the magnetically recorded data can be read as changes in the output voltage.

Since, in the central active area, the magnetoresistive film constitutes the lowermost layer on top of the supporting body, with the nonmagnetic spacer film laminated on top of the magnetoresistive film and the soft magnetic film laminated on top of the nonmagnetic spacer film, when forming these films through high accuracy pattern forming technology, which mainly employs photolithography and ion milling, the flat surface area S1 of the lowermost layer, i. e., the magnetoresistive film is larger than the flat surface area S0 of the uppermost layer, i. e., the soft magnetic film. Thus, S1>S0 is satisfied. Note that the film thickness of the soft magnetic film is approximately equal to that of the magnetoresistive film.

Since the saturation magnetization M0 of the soft magnetic film is approximately 1 to 0. 6 times the saturation magnetization M1 of the magnetoresistive film, M1≧M0 is satisfied. With these conditions, i. e., S1>S0 and M1≧M0, (M1. V1) >(M0. V0 ) is always true. With this, it becomes more difficult to provide an appropriate lateral bias magnetic field from the soft magnetic film to the magnetoresistive film (underbias). When this is considered from the view point of the off track characteristics, it means that the point at which the magnetic field generated by the magnetically recorded data on the magnetic recording medium aligns with the direction of the magnetization of the magnetoresistive film moves away from the main output pulse peak point. This facilitates the design of a signal processing circuit by increasing the width of the main output pulse and the off track margin.

Furthermore, since an under bias state is ensured, it may be possible to set the bias to an appropriate state by adjusting the sense current to achieve the correct bias state without causing a reduction in output.

As the end passive areas are connected to the two side surfaces of the central active area, sense current can be applied to the central active area via the end passive areas and also the required magnetic bias can be applied the same way. In a normal structure, each end passive area will include a magnetic domain control film which has electrical and magnetic continuity with, at least, the magnetoresistive film, which will make it possible to apply the sense current described above and also to apply a magnetic bias that corresponds to the magnetic domain control film to the magnetoresistive film.

The thin film magnetic head according to the present invention includes an MR type magnetic transducer that is supported by a slider and is constituted with the magnetic transducer according to the present invention. Because of this, with the thin film magnetic head according to the present invention, the advantages of the MR type magnetic transducer according to the present invention are directly obtained.

BRIEF DESCRIPTION OF THE DRAWINGS

These and other advantages, features and objects of the present invention will be understood by those of ordinary skill in the art referring to the annexed drawings, given purely by way of non - limitative example, in which.

DETAILED DESCRIPTION OF THE PREFERRED EMBODIMENTS

Figure 1:
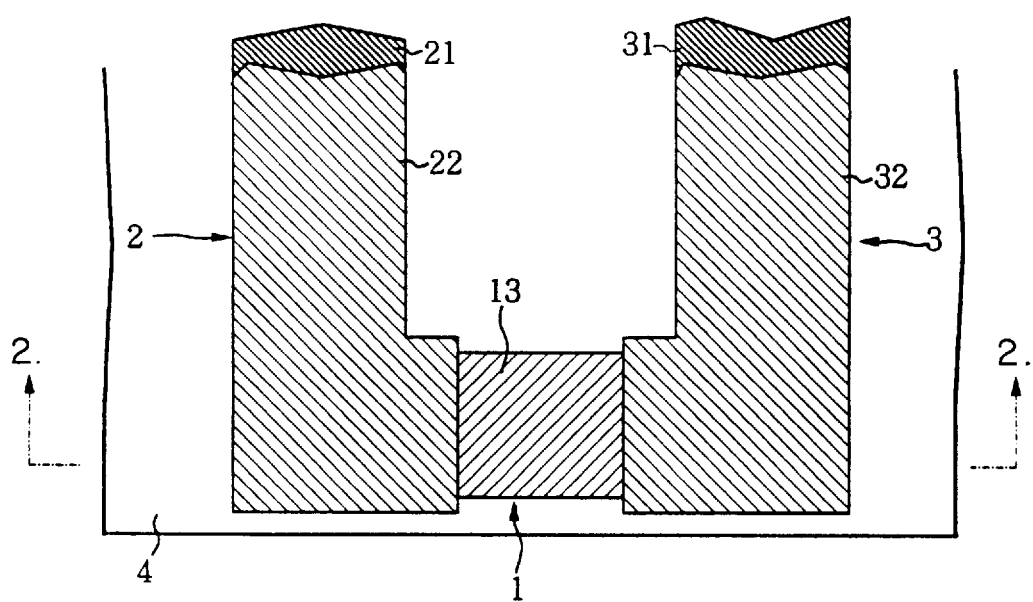
FIG. 1 illustrates a plan view of the magnetic transducer according to the present invention.
Figure 2:
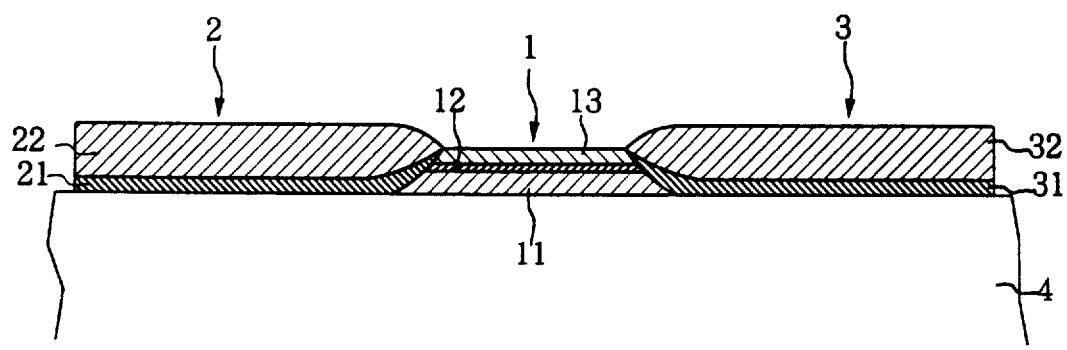
FIG. 2 illustrates a cross section of FIG. 1 through line 2—2.

As illustrated in FIGS. 1 and 2, the magnetic transducer according to the present invention comprises a central active area 1 and end passive areas 2 and 3 and is supported by a supporting body 4. The central active area 1 includes a magnetoresistive film (hereafter referred to as the MR film) 11, a nonmagnetic spacer film 12 and a soft magnetic film 13 with the MR film 11 constituting the lowermost layer on top of the supporting body, the nonmagnetic spacer film 12 laminated on top of the MR film 11 and the soft magnetic film 13 laminated on top of the nonmagnetic spacer film 12 to provide a lateral bias field to the MR film 11. The MR film 11 is formed from, for instance, permalloy. Its composition, thickness, manufacturing method and the like are known to those with ordinary skill in the field this technology pertains to. The soft magnetic film 13 is a magnetic film that has little or no magnetoresistance, and may be constituted of, for instance, Ni—Fe—Rh, Ni—Fe—Cr, may be amorphous, and is formed to have a thickness of, for instance, 200 to 300 Å. The nonmagnetic spacer film 12 is constituted of a Ta film with a thickness of, for instance, 100 to 200 Å. This lamination structure is typical in MR type magnetic transducers.

The end passive areas 2 and 3 are connected to the two side surfaces of the central active area 1.

Since the central active area 1 includes the MR film 11, the nonmagnetic spacer film 12 and the soft magnetic film 13 and is constituted with the MR film 11, the nonmagnetic spacer film 12 and the soft magnetic film 13 laminated so that the soft magnetic film 13 provides a lateral bias field to the MR film 11, the magnetization direction of the MR film 11 is changed by the magnetic field generated by the magnetically recorded data on the magnetic recording medium, and the data are read by changing the resistance value of the MR film 11 to which the sense currents run in correspondence to changes in the direction of magnetization in the MR film 11.

Figure 3:
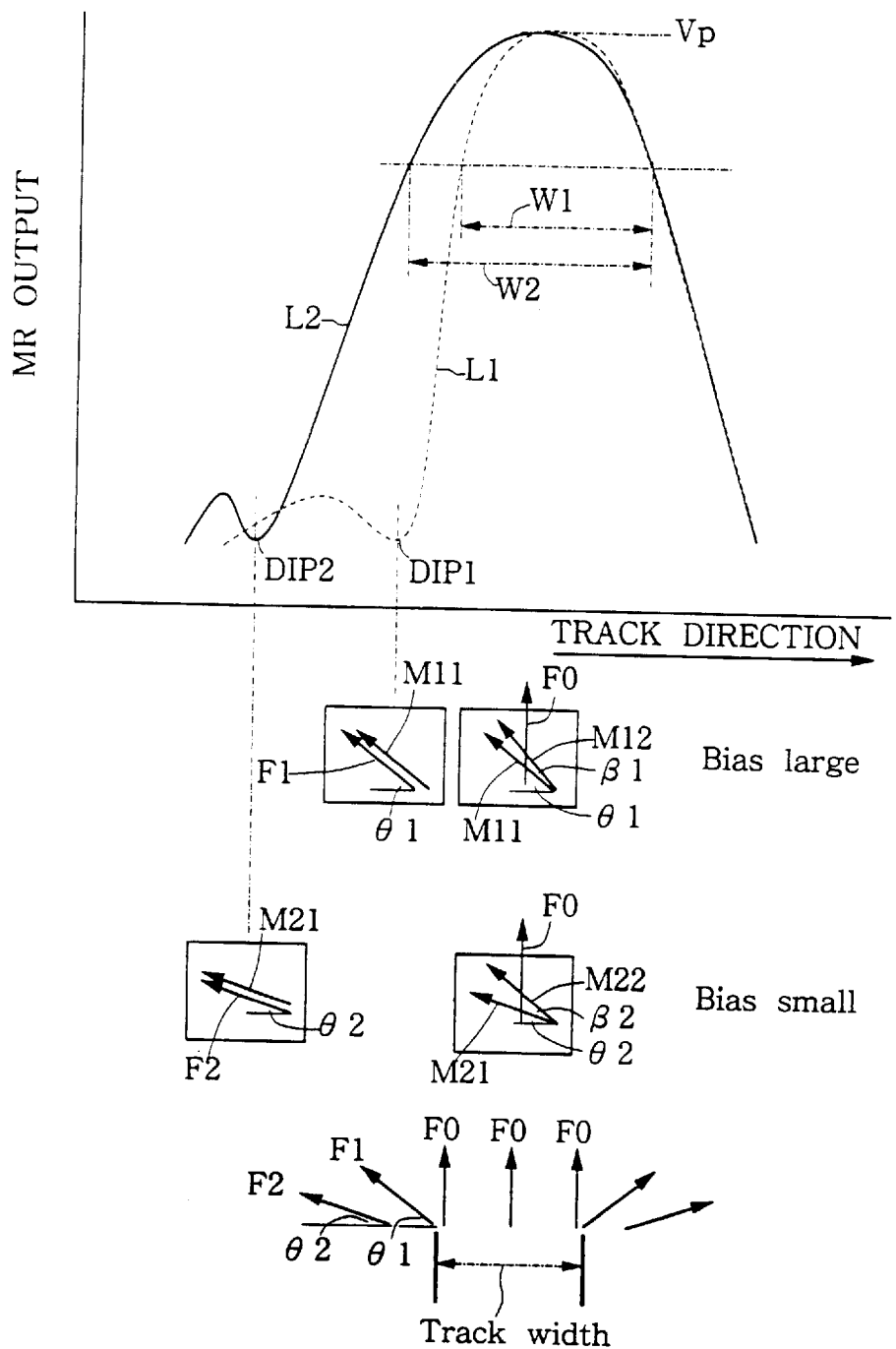
FIG. 3 illustrates the magnetic recording read function performed by the magnetic transducer.

Since, in the central active area 1, the MR film 11 constitutes the lowermost layer on top of the supporting body with the nonmagnetic spacer film 12 laminated on top of the MR film 11 and the soft magnetic film 13 laminated on top of the nonmagnetic spacer film 12, under normal manufacturing conditions, in which these films are formed through high accuracy pattern forming technology, which mainly employs photolithography and ion milling, the flat surface area S1 of the lowermost layer, i.e., the MR film 11 is larger than the flat surface area S0 of the uppermost layer, i. e. , the soft magnetic film 13. Thus, S1>S0 is satisfied. Note that the film thickness of the soft magnetic film 13 is approximately equal to that of the MR film 11. Since the saturation magnetization M0 of the soft magnetic film 13 is approximately 1 to 0. 6 times the saturation magnetization M1 of the MR film 11, M1≧M0 is satisfied. Therefore, (M1. V1 ) >(M0. V0 ). With this, it becomes more difficult to provide an appropriate lateral bias field from the soft magnetic film 13 to the MR film 11. As a result, the point at which the magnetic field generated by the magnetically recorded data on the magnetic recording medium aligns with the magnetization direction of the MR film 11, to which the lateral bias field is provided, moves away from the main output pulse peak point in the off track characteristics. Thus, the width of the main output pulse and the off track margin can be increased. This aspect is further explained in reference to FIG. 3. In FIG. 3, the horizontal axis represents the track direction and the vertical axis represents the MR output. Below the horizontal axis, the track D1 of the magnetic recording medium (not shown) and the read magnetic fields F0 to F2 , which are thereby generated, are illustrated. The state in which a strong lateral bias field is provided by the soft magnetic film 13 to the MR film 11 is schematically illustrated where "bias large" is indicated. The lateral bias magnetization M11 is biased in the direction in which it inclines at an angle θ1 relative to the horizontal direction (in the figure).

The state in which an weak lateral bias field is provided by the soft magnetic film 13 to the MR film 11 is schematically illustrated where "bias small" is indicated. The lateral bias magnetization M21 is biased in the direction in which it inclines at an angle θ2 relative to the horizontal direction (in the figure). The angles θ1 and θ2 have a relationship in which θ1>θ2.

First, a case in which the bias is large is explained. The magnetic field generated by the magnetically recorded data on the magnetic recording medium disperses in every direction from the track D1 and, as a result, when the magnetic transducer reads the track D1 while moving along the track direction at high speed, there is a point at an off track position where the direction of the magnetic field F1 generated by the magnetically recorded data on the magnetic recording medium is aligned with the direction of the lateral bias magnetization M11. Since, at this position, almost no change occurs in the resistance value of the MR film 11, this point becomes the minimum point DIP1 which gives the minimum MR output. Within the track, the angle at which the read magnetic field F0 crosses the direction of the lateral bias magnetization M11 is steep and, therefore, the lateral bias magnetization M11 rotates in the direction of the read magnetic field F0. Due to the effect of the read magnetic field F0, the lateral bias magnetization M11 rotates by an angle β1 and a large change in the resistance value of the MR film 11 occurs. The main output pulse L1 is generated in this manner.

When the bias is small, the operation is basically the same. However, since the lateral bias field is weak, and the angle β2 of the lateral bias magnetization M21 is small, the minimum point DIP2 , at which the direction of the lateral bias magnetization M11 and the read magnetic field F2 align with each other, occurs at a position that is further away from the peak value VP of the main output pulse L2, compared to the minimum point DIP1 that occurs when the bias field is large. Consequently, when the bias field is small, the main output pulse width W2 is larger than the main output pulse width W1 obtained when the bias field is large, thereby ensuring a large margin.

As explained so far, according to the present invention, the lateral bias magnetization is in an under bias state compared to the prior art and, as a result, the margin can be increased by increasing the width of the main output pulse.

Also, because an under bias state is achieved, a reduction in output can be prevented even when the bias is adjusted to a suitable state by increasing the sense currents.

As the end passive areas 2 and 3 are connected to the two side surfaces of the central active area 1, a sense current can be applied to the central active area 1 via the end passive areas 2 and 3 and also the required magnetic bias field can be provided in the same way. In a normal structure, the end passive areas 2 and 3 include magnetic domain control films 21 and 31 respectively, which have electrical and magnetic continuity with, at least, the MR film 11, to make it possible to apply the sense current described above and also to apply a magnetic bias, which corresponds to the magnetic domain control films 21 and 31, to the MR film 11.

The magnetic domain control films 21 and 31 can be constituted with hard magnetic films. In that case, by using the magnetic field generated by the magnetized hard magnetic films 21 and 31, a consistent longitudinal bias field can be provided to the MR film 11 to prevent generation of Barkhausen noise caused by the movement of the magnetic domain. The hard magnetic films may be, for instance, CoPtCr and they are formed to have a film thickness of approximately 200 Å.

Alternatively, the magnetic domain control films 21 and 31 may be constituted with antiferromagnetic films and, in that case, by using the exchange coupling generated between the antiferromagnetic films and the MR film 11, a consistent longitudinal bias field can be provided to the MR film 11 to prevent generation of Barkhausen noise caused by the movement of the magnetic domain. The antiferromagnetic films may be, for instance, Fe- Mn and they are formed to have a film thickness of approximately 200 Å.

The end passive areas 2 and 3 include lead conductive films 22 and 32 respectively as well as the magnetic domain control films 21 and 31. The lead conductive films 22 and 32 are deposited on to the magnetic domain control films 21 and 31, while being provided with patterns that are overlaid on the magnetic domain control films 21 and 31 on the central active area 1. Because of this, sense currents can be supplied to the central active area 1 mainly through the lead conductive films 22 and 32 at both sides of the central active area 1.

The lead conductive films 22 and 32 are adhered on to the magnetic domain control films 21 and 31 respectively, while being provided with patterns that are overlaid on the magnetic domain control films 21 and 31, on the central active area 1 and also outside that area. As a result, the magnetic domain control films 21 and 31 and the lead conductive films 22 and 32 can be formed through the high accuracy pattern forming technology, which mainly employs photolithography, ion milling and a film forming process, in one step. The lead conductive films 22 and 32 are each constituted with a laminated film of, for instance, TiW/Ta.

Figure 4:
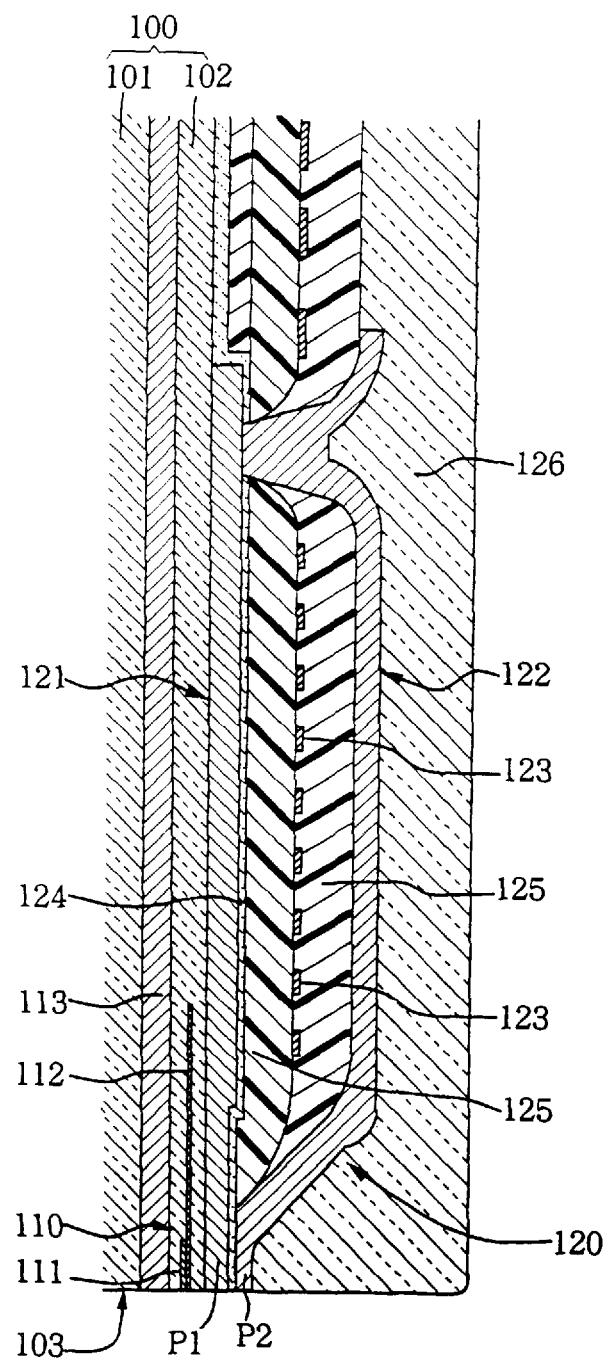
FIG. 4 illustrates an enlarge cross section of a thin film magnetic head that employs the magnetic transducer according to the present invention as a read element.

FIG. 4 is an enlarged cross section of a thin film magnetic head that employs the magnetic transducer described above as a read element and also employs an inductive type magnetic transducer as a write element. The thin film magnetic head in the figure is provided with a read element 110 constituted with an MR type magnetic transducer and a write element 120 constituted with an inductive type magnetic transducer, on a slider 100.

The slider 100, constituted with a ceramic body, is provided with an insulating film 101 formed of $Al_2O_3$ or $SiO_2$ on a base body which is constituted of, for instance, $Al_2O_3$ TiC. The slider 100, is provided with an air bearing surface (hereafter referred to as the ABS) 103 toward one surface that faces opposite the magnetic disk. The type of slider in which a rail portion is provided on the surface facing opposite the magnetic disk with the surface of the rail portion being used as the ABS, and the type of slider in which the surface that faces opposite the magnetic disk is a flat surface without a rail portion, and almost the entire surface is used as the ABS, are known in the prior art and any of these may be used for the slider 100.

The read element 110 is constituted by embedding an MR type magnetic transducer 111 as a film inside an insulating film 102. Reference number 112 indicates a lead conductive film through which power is supplied to the MR type magnetic transducer 111. The lead conductive film 112 corresponds to the lead conductive films 22 and 32 in FIGS. 1 and 2. The MR type magnetic transducer 111 and the lead conductive films 112 emerge at the ABS 103 of the slider 100 to minimize the spacing loss. Reference number 113 indicates a lower shield film which is constituted with a magnetic film of, for instance, sendust, permalloy or iron nitride. Reference number 121 indicates an upper shield film (also functions as a lower magnetic film) and is constituted of a magnetic film such as permalloy or iron nitride, for instance.

The read element 110 is constituted with an MR type magnetic transducer 111 according to the present invention as described earlier. Because of this, the advantages and effects of the MR type magnetic transducer according to the present invention are directly obtained.

The write element 120 is provided with the lower magnetic film 121, which also functions as the upper shield film, an upper magnetic film 122, a coil film 123, a gap film 124 of, for instance, alumina, an insulating film 125 constituted of an organic resin such as Novolac resin, a protective film 126 and the like, and is laminated on top of the insulating film 102. The front end portions of the lower magnetic film 121 and the upper magnetic film 122 constitute pole portions P1 and P2 which face opposite each other over the gap film 124, which has a very small thickness and write is performed at the pole portions P1 land P2. The yoke structure is constituted with the lower magnetic film 121 and the upper magnetic film 122 being linked to each other at a back gap portion that is on the opposite side from the pole portions P1 and P2, so as to complete a magnetic circuit. The coil film 123 is formed on top of the insulating film 125 in such a manner that the coil film 123 coils around the linked area of the yoke structure. While in the figure, an in plane read/write magnetic head is shown, the magnetic head may be a vertical type read/write magnetic head, or the like.

While the invention has been particularly shown and described with reference to preferred embodiments thereof, it will be understood by those skilled in the art that various changes in form and detail may be made therein without departing from the spirit and scope of the invention.

What is claimed is;

1. A magnetic transducer comprising a central active area and end passive areas, supported by a supporting body wherein;

said central active area includes a magnetoresistive film, a nonmagnetic spacer film and a soft magnetic film with said magnetoresistive film constituting the lowermost layer on top of said supporting body, said nonmagnetic spacer film laminated on top of said magnetoresistive film and said soft magnetic film laminated on top of said nonmagnetic spacer film to provide a lateral bias field to said magnetoresistive film, so that the product of the saturation magnetization and the volume of the magnetoresistive film is greater than the product of the saturation magnetization and the volume of the soft magnetic film;

said end passive areas each include a magnetic domain control film and a lead conductive film and are connected to two side surfaces of said central active area, said magnetic domain control film having electrical and magnetic continuity with said magnetoresistive film; and said lead conductive film being in contact with and laminated on top of said magnetic domain control film.

2. A magnetic transducer according to claim 1 wherein; said magnetic domain control film is constituted with a hard magnetic film.

3. A magnetic transducer according to claim 1 wherein; said magnetic domain control film is constituted with an antiferromagnetic film.

4. A magnetic transducer according to claim 1 wherein; an area of a lower surface of said magnetoresistive film facing the upper surface of said supporting body is greater than an area of a surface of said soft magnetic film in contact with said nonmagnetic spacer film.

5. A thin film magnetic head comprising a slider and a magnetic transducer supported by said slider, said magnetic transducer comprising:

a central active area and end passive areas, supported by a supporting body;

said central active area including a magnetoresistive film, a nonmagnetic spacer film and a soft magnetic film with said magnetoresisive film constituting the lowermost layer on top of said supporting body, said nonmagnetic spacer film laminated on top of said magnetoresistive film and said soft magnetic film laminated on top of said nonmagnetic spacer film to provide a lateral bias field to said magnetoresistive film, so that the product of the saturation magnetization and the volume of the magnetoresistive film is greater than the product of the saturation magnetization and the volume of the soft magnetic film;

said end passive areas each include a magnetic domain control film which has electrical and magnetic continuity with said magnetoresistive film and a lead conductive film and are connected to two side surfaces of said central active area; and said lead conductive film being in contact with and laminated on top of said magnetic domain control film.

\* \* \* \* \*